United States Patent
Uchida et al.

[19]

[11] Patent Number: 6,057,051

[45] Date of Patent: May 2, 2000

[54] MINIATURIZED FUEL CELL ASSEMBLY

[75] Inventors: Makoto Uchida, Hirakata; Yuko Fukuoka, Kyoto; Yasushi Sugawara, Neyagawa; Nobuo Eda, Hirakata, all of Japan

[73] Assignee: Matsushita Electric Industrial Co., Ltd., Osaka, Japan

[21] Appl. No.: 08/795,352

[22] Filed: Feb. 4, 1997

[30] Foreign Application Priority Data

Feb. 5, 1996 [JP] Japan ..................................... 8-018544
Sep. 13, 1996 [JP] Japan ..................................... 8-242762

[51] Int. Cl.⁷ .................................................. H01M 8/18
[52] U.S. Cl. ............................... 429/19; 429/27; 429/30; 429/34; 429/59
[58] Field of Search ................................ 429/19, 27, 30, 429/34, 59

[56] References Cited

U.S. PATENT DOCUMENTS

| | | | |
|---|---|---|---|
| 4,000,003 | 12/1976 | Baker et al. | 429/12 |
| 4,261,956 | 4/1981 | Adlhart | 422/239 |
| 4,780,187 | 10/1988 | Levy et al. | 204/129 |
| 4,792,384 | 12/1988 | Levy et al. | 204/129 |
| 4,826,741 | 5/1989 | Aldhart et al. | 429/19 |
| 4,826,742 | 5/1989 | Reiser | 429/35 |
| 5,200,278 | 4/1993 | Watkins et al. | 429/34 |
| 5,252,410 | 10/1993 | Wilkinson et al. | 429/34 |
| 5,314,762 | 5/1994 | Hamada et al. | 429/59 |

FOREIGN PATENT DOCUMENTS

| | | |
|---|---|---|
| 393045 | 7/1991 | Austria . |
| 54-22537 | 2/1979 | Japan . |
| 60-54177 | 3/1985 | Japan . |
| 2260371 | 10/1990 | Japan . |
| 4308662 | 10/1992 | Japan . |
| 5-54900 | 3/1993 | Japan . |
| 554900 | 3/1993 | Japan . |
| 5190196 | 7/1993 | Japan . |
| 6-60895 | 3/1994 | Japan . |
| 660894 | 3/1994 | Japan . |
| 660895 | 3/1994 | Japan . |
| 676851 | 3/1994 | Japan . |
| 684536 | 3/1994 | Japan . |
| 684539 | 3/1994 | Japan . |
| 6275297 | 9/1994 | Japan . |
| 6338338 | 12/1994 | Japan . |
| 7245116 | 9/1995 | Japan . |
| 7326375 | 12/1995 | Japan . |
| 8-111229 | 4/1996 | Japan . |
| 9604690 | 2/1996 | WIPO . |

OTHER PUBLICATIONS

1996 Fuel Cell Seminar (Program and Abstracts) Nov. 17–20, 1996, p. 331–334 and 672–673.

"Patent Abstracts of Japan", vol. 9, No. 185, (E–332), Jul. 31, 1985 & JP 60 054177A, (Hitachi Seisakusho KK), Mar. 28, 1985.

Ward et al., "Design for the Cold Start–Up of a Man–Portable Fuel Cell and Hydrogen Storage System", Journal of Power Sources, vol. 41, No. 3, Jan. 19, 1993, pp. 335–352.

"Patent Abstracts of Japan", vol. 96, No. 8, Aug. 30, 1996 & JP 08 111229A (Sanyo Electric Co., Ltd.).

Primary Examiner—Maria Nuzzolillo
Assistant Examiner—Laura Weiner
Attorney, Agent, or Firm—Stevens, Davis, Miller & Mosher, L.L.P.

[57] ABSTRACT

A miniaturized fuel cell assembly to power portable electronic equipment includes a hydride hydrogen storage unit, a control unit for controlling the flow of hydrogen, a hydrogen supply device interconnecting the hydrogen storage unit and the fuel cell body, and an air feed device to supply oxygen necessary for the generation of electricity. The fuel cell assembly may also have an air feed device to cool the interior of the equipment, including a water retention device for recovering and retaining water formed in the fuel cell body, and a humidifying device using the recovered water to humidify the hydrogen to be supplied to the fuel cell body. The miniaturized fuel cell assembly facilitates the effective transfer of waste heat from the fuel cell to the hydrogen storage unit, and as a result of its ability to be used repeatedly, can be utilized for a greater length of time than a conventional primary or secondary power cell.

15 Claims, 14 Drawing Sheets

6b

6,057,051

MINIATURIZED FUEL CELL ASSEMBLY

BACKGROUND OF THE INVENTION

This invention relates to a power source system adapted for mounting on a portable equipment such as a note-type personal computer and the like, and more particularly to a power system employing a microminiaturized type polymer electrolyte fuel cell which uses hydrogen as fuel and uses air as an oxidant.

With respect to examples using a fuel cell as a portable power source, Japanese Patent Unexamined Publication Nos. 4-308662 and 6-60894 disclose a series of prior art techniques, in which a phosphoric acid fuel cell is driven by hydrogen, supplied from a hydrogen storing alloy, and air. Also, Japanese Patent Unexamined Publication Nos. 54-22537 and 2-260371 disclose a construction, in which a polymer electrolyte fuel cell is driven by hydrogen, supplied from a hydrogen storing alloy, and air. U.S. Pat. No. 5,200,278 discloses a small-sized power source system, which though not portable, can be transported, and comprises a polymer electrolyte fuel cell, and in which formed water is recovered and is used as cooling water and humidifying water. In this system, a humidifying section for fuel and an oxidant is constructed integrally by a power-generating section of a lamination and end plates. In this humidifying section, the fuel or the oxidant is supplied to one side of an ion exchange membrane while water is supplied to the other side, and the membrane allows only moisture or water to pass therethrough, and utilizing this nature, the fuel or the oxidant is humidified. There have been proposed various other humidifying methods. For example, Japanese Patent Unexamined Publication No. 5-54900 discloses a humidifying method using either a power spray having a pressurized water spray nozzle provided in a supply passage for fuel or oxidant gas, or an ultrasonic humidifier having a water surface of a fined spray. Japanese Patent Unexamined Publication No. 6-338338 discloses a humidifying method, in which a porous fuel flow-field plate or a porous oxidant flow-field plate is provided between a separator plate and a unit cell, and water is supplied into the flow-field plate, thereby effecting humidification through fine holes in the flow-field plate. Japanese Patent Unexamined Publication No. 7-245116 discloses a construction, in which a humidifier using hollow membranes is provided in a stack of stacked cells to make a fuel cell compact.

However, in the above conventional portable fuel cells and polymer electrolyte fuel cell systems, a construction for mounting the fuel cell or the system on a portable equipment, as well as a construction for achieving compactness, has not been taken into consideration. For example, in the series of techniques described in Japanese Patent Unexamined Publications Nos. 4-308662 and 6-60894, various constructions for driving a fuel cell by the use of hydrogen produced from a hydrogen storing alloy are disclosed. In this system, however, since a phosphoric acid fuel cell is used, a special construction for operating a polymer electrolyte fuel cell including a humidifying mechanism is not taken into consideration. Although Japanese Patent Unexamined Publications Nos. 54-22537 and 2-260371 disclose the construction, in which the polymer electrolyte fuel cell is driven by hydrogen supplied from the hydrogen storing alloy, these publications disclose only the construction for transferring heat of the fuel cell to the hydrogen storing alloy, a wick member for recovering the formed water, and a water-permeable member but do not disclose a construction for miniaturization. Although various descriptions, relating to the constructions of the polymer electrolyte fuel cell and the system, are given in U.S. Pat. No. 5,200,278, a construction designed for mounting the system on an equipment, as well as a construction for miniaturization, is not suggested.

The humidifying methods disclosed in the above prior art techniques are problematic in that a water piping is complicated, the system itself requires an auxiliary power, and a construction for miniaturization, including a construction for recovering the formed water.

Generation of electricity by a fuel cell is accompanied by generation of heat. A polymer electrolyte, when containing water or moisture, exhibits a proton-conducting nature, and therefore when the polymer electrolyte is dried to be lowered in water content as the fuel cell generates heat, an internal resistance of the fuel cell increases to lower a power-generating ability of the fuel cell. Therefore, in order to prevent drying of the polymer electrolyte, the fuel cell needs to be cooled. On the other hand, a process of emission of hydrogen from a hydrogen storing alloy is an endothermic reaction, and so the hydrogen storing alloy, when supplying hydrogen fuel, is lowered in temperature. A hydrogen-emitting ability of the hydrogen storing alloy is lowered as the temperature lowers, and therefore in order to secure a sufficient flow rate of hydrogen, the hydrogen storing alloy needs to be heated. Therefore, it has been proposed to utilize heat, generated from the fuel cell, for heating the hydrogen storing alloy.

For example, Japanese Patent Unexamined Publication No. 2-260371 discloses a method, in which waste heat of the fuel cell is transferred to a hydrogen storing alloy container through direct heat transfer of separator plates of the fuel cell. Japanese Patent Unexamined Publication No. 6-60894 discloses a construction, in which an exhaust gas of the fuel cell passes around a hydrogen storing alloy container. Further, Japanese Patent Unexamined Publication No. 6-60895 discloses a construction, in which passage opening control means is provided in an exhaust gas passage, extending from a fuel cell body to a hydrogen storing alloy container, so as to adjust a heat transfer rate, thereby controlling a pressure of hydrogen.

However, in the above conventional portable fuel cells and polymer electrolyte fuel cell systems, a more efficient heat transfer construction for miniaturization necessary for mounting the fuel cell system on an equipment, has not been taken into consideration. For example, in the series of techniques described in Japanese Patent Unexamined Publications Nos. 6-60894 and 6-60895, there is disclosed a construction, in which waste heat of the fuel cell is transferred or transmitted to the hydrogen storing alloy container only by an air flow. However, in a microminiaturized system adapted for mounting on an equipment, to which the present invention is directed, a sufficient space for a path of such air flow is not ensured, so that the thermal transfer efficiency is not sufficient. Japanese Patent Unexamined Publication No. 2-260371 discloses a construction, in which heat is transferred directly to the hydrogen storing alloy container through thermal transfer of the separator plates. However, when the electrically-conductive separator plates are connected directly to the container, generated electricity flows into the container. Namely, there has been encountered a problem that it is difficult to secure sufficient thermal transfer in a limited volume while making the two contrary characteristics, that is, maintenance of an electrically-insulated condition of each separator plate and transfer of heat generated by each unit cell, compatible with each other.

SUMMARY OF THE INVENTION

The present invention has its object to overcome the above problems of the prior art, and to provide a polymer electrolyte fuel cell system for mounting on an equipment, which is integrally formed into a single package to be microminiaturized.

To attain the above object, the present invention provides a fuel cell device adapted for mounting on a portable equipment such as a personal computer, comprising a fuel cell body, a hydride-hydrogen storage unit necessary for the fuel cell body, a control unit for controlling a flow of the hydrogen from the hydrogen storage unit to control an operation of a fuel cell in the fuel cell body, hydrogen supply means interconnecting the hydrogen storage unit and the fuel cell body to supply the hydrogen from the hydrogen storage unit to the fuel cell body, and air feed means for supplying air to the fuel cell body to supply oxygen necessary for the generation of electricity performed by the fuel cell.

Also, the invention provides a fuel cell device adapted for mounting on a portable equipment such as a personal computer, comprising a fuel cell body, a hydride-hydrogen storage unit necessary for the fuel cell body, a control unit for controlling a flow of the hydrogen from the hydrogen storage unit to control an operation of a fuel cell in the fuel cell body, hydrogen supply means interconnecting the hydrogen storage unit and the fuel cell body to supply the hydrogen from the hydrogen storage unit to the fuel cell body, air feed means for supplying air to the fuel cell body to supply oxygen necessary for the generation of electricity performed by the fuel cell, water retention means for recovering and retaining water formed in the fuel cell body, humidifying means for humidifying the hydrogen to be supplied to the fuel cell body, using the recovered water, and a cell device casing receiving therein the above-mentioned components of the fuel cell device, the cell device casing being connected electrically and mechanically removably to the equipment, and wherein the cell device casing has an intake port and an exhaust port of the air feed means, and means, by which the hydrogen storage unit can be inserted into and removed from the cell device casing, and wherein the hydrogen supply means is detachably connected to the hydrogen storage unit.

Further, the invention provides a fuel cell device adapted for mounting on a portable equipment having air feed means for cooling an interior of the equipment, comprising a fuel cell body, a hydrogen storage unit occluding hydrogen necessary for the fuel cell body, a control unit for controlling a flow of the hydrogen from the hydrogen storage unit to control an operation of a fuel cell in the fuel cell body, hydrogen supply means interconnecting the hydrogen storage unit and the fuel cell body to supply the hydrogen from the hydrogen storage unit to the fuel cell body, water retention means for recovering and retaining water formed in the fuel cell body, and humidifying means for humidifying the hydrogen to be supplied to the fuel cell body, using the recovered water, and a cell device casing receiving therein the above-mentioned components of the fuel cell device, the cell device casing being connected electrically and mechanically removably to the equipment, and wherein the cell device casing has an intake port and an exhaust port of the air feed means, and means, by which the hydrogen storage unit can be inserted into and removed from the cell device casing, and wherein an air flow produced by the air feed means provided on the equipment is conducted to the fuel cell body, and oxygen necessary for the generation of electricity performed by the fuel cell is provided by the air flow.

In the present invention, waste heat of the fuel cell can be transmitted or transferred more effectively to the hydrogen storage unit, and there can be provided a novel, microminiature power system for mounting on an equipment, and this power system enables the equipment to be operated for a longer time as compared with the case where a conventional cell is used, and this cell system can be used repeatedly.

DESCRIPTION OF THE PREFERRED EMBODIMENTS

Figure 30:
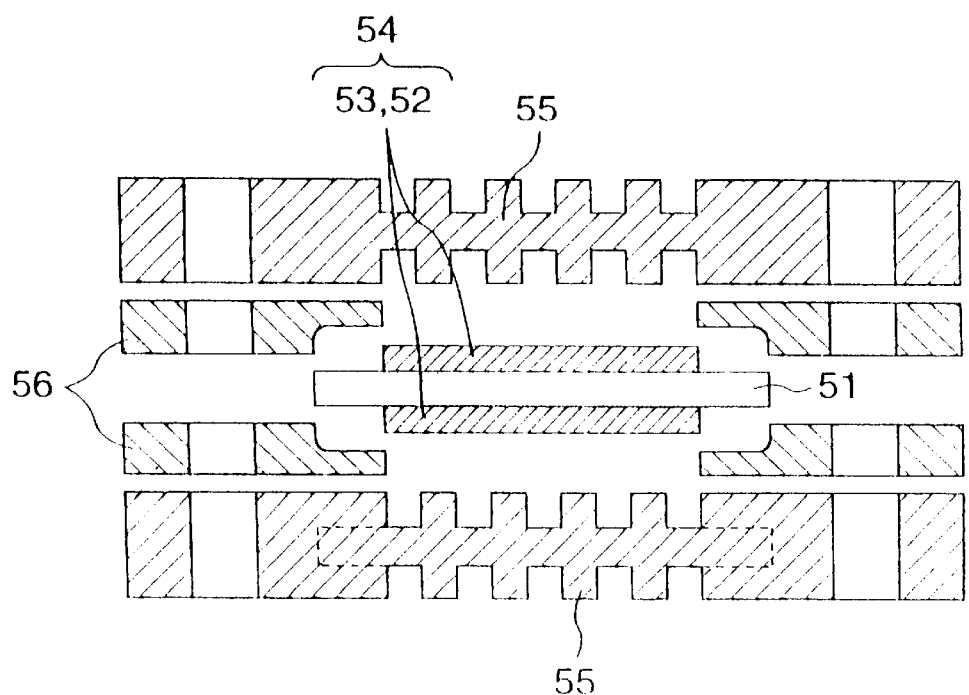
FIG. 30 is a cross-sectional view showing a construction of a unit cell in a polymer electrolyte fuel cell.
Figure 31:
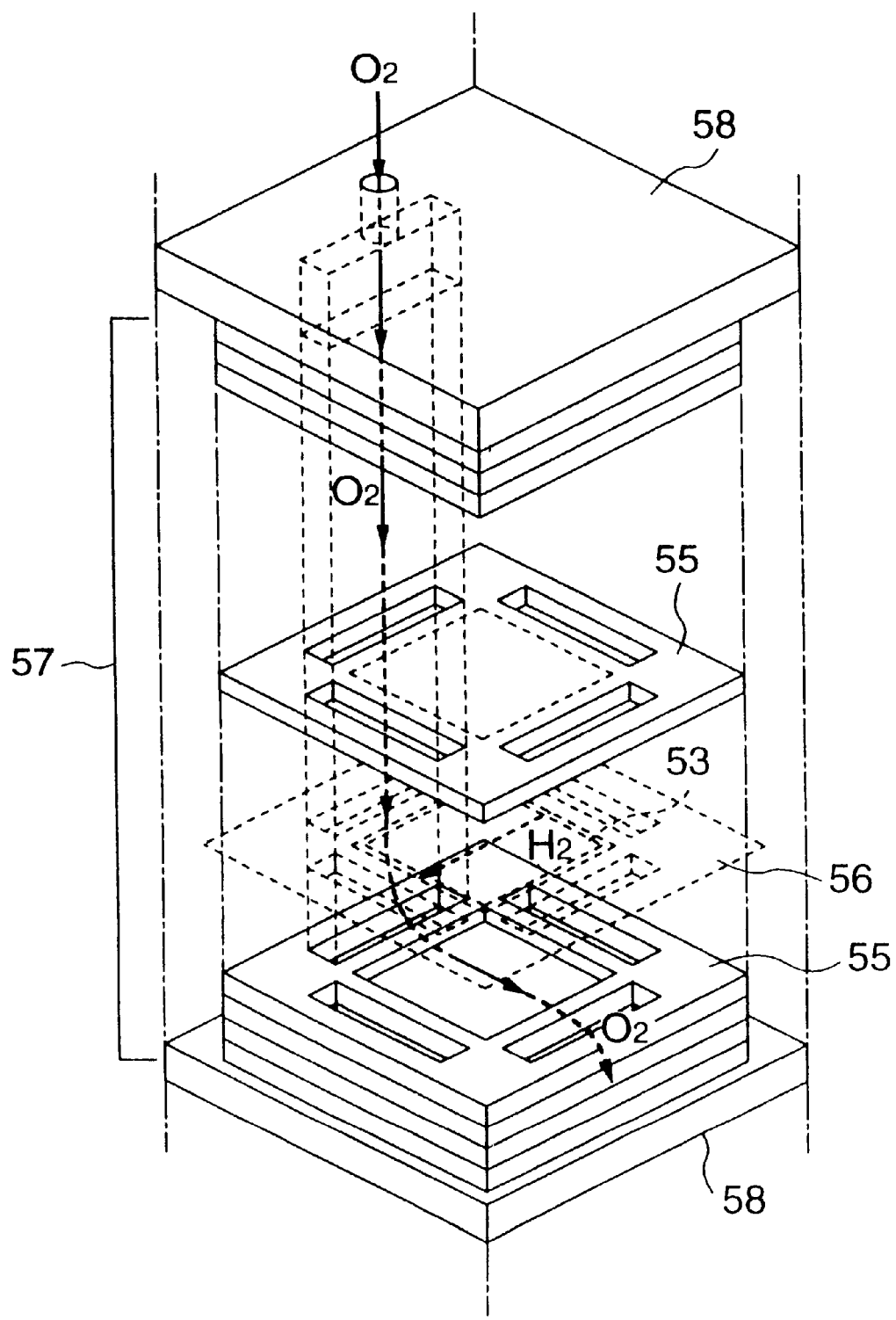
FIG. 31 is a perspective view of an electricity-generating unit having a plurality of unit cells connected together.

The principle and structure of a polymer electrolyte fuel cell will first be described with reference to FIGS. 29, 30 and 31.

Figure 29:
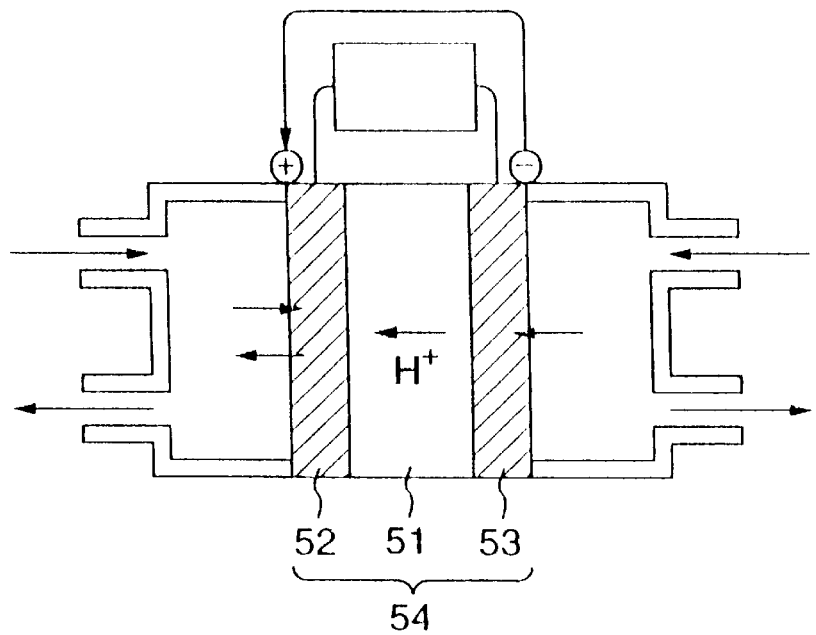
FIG. 29 is a view explanatory of a principle of a polymer electrolyte fuel cell.

The polymer electrolyte fuel cell uses ion exchange membranes, which are a solid polymer electrolyte, as an electrolyte, and a general construction thereof is shown in FIG. 29. In this construction employing the ion exchange membranes 51, a positive electrode 52 and a negative electrode 53 are formed respectively on both sides of the membrane 51 to provide a layer construction, thus forming a unit cell 54. When hydrogen is used as fuel, the following reaction occurs in an interface of contact between a catalyst and the polymer electrolyte at the negative electrode:

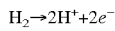

$$H_2 \rightarrow 2H^+ + 2e^-$$

When oxygen is used as an oxidant, the following reaction occurs at the positive electrode, so that water is formed.

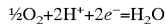

$$\tfrac{1}{2}O_2 + 2H^+ + 2e^- = H_2O$$

The catalyst serves as an active site of the reaction, and the electrode layers serve as a conductor for electrons in the above reaction, and the polymer electrolyte serves as a conductor for hydrogen ions. However, the polymer electrolyte does not exhibit a practical ion-permeable property before it contains water or moisture. Therefore, with respect to a power system using the polymer electrolyte fuel cell, characteristically, a method of humidifying the polymer electrolyte has been extensively studied. The unit cells 54 are together connected in series, using separator plates 55 and gaskets 56 as shown in FIG. 30 to form a stack 57 shown in FIG. 31, and this stack is fastened between a pair of end plates 58 to provide an electricity-generating unit.

A first embodiment of the present invention will now be described in detail with reference to FIGS. 1 to 11.

Figure 1:
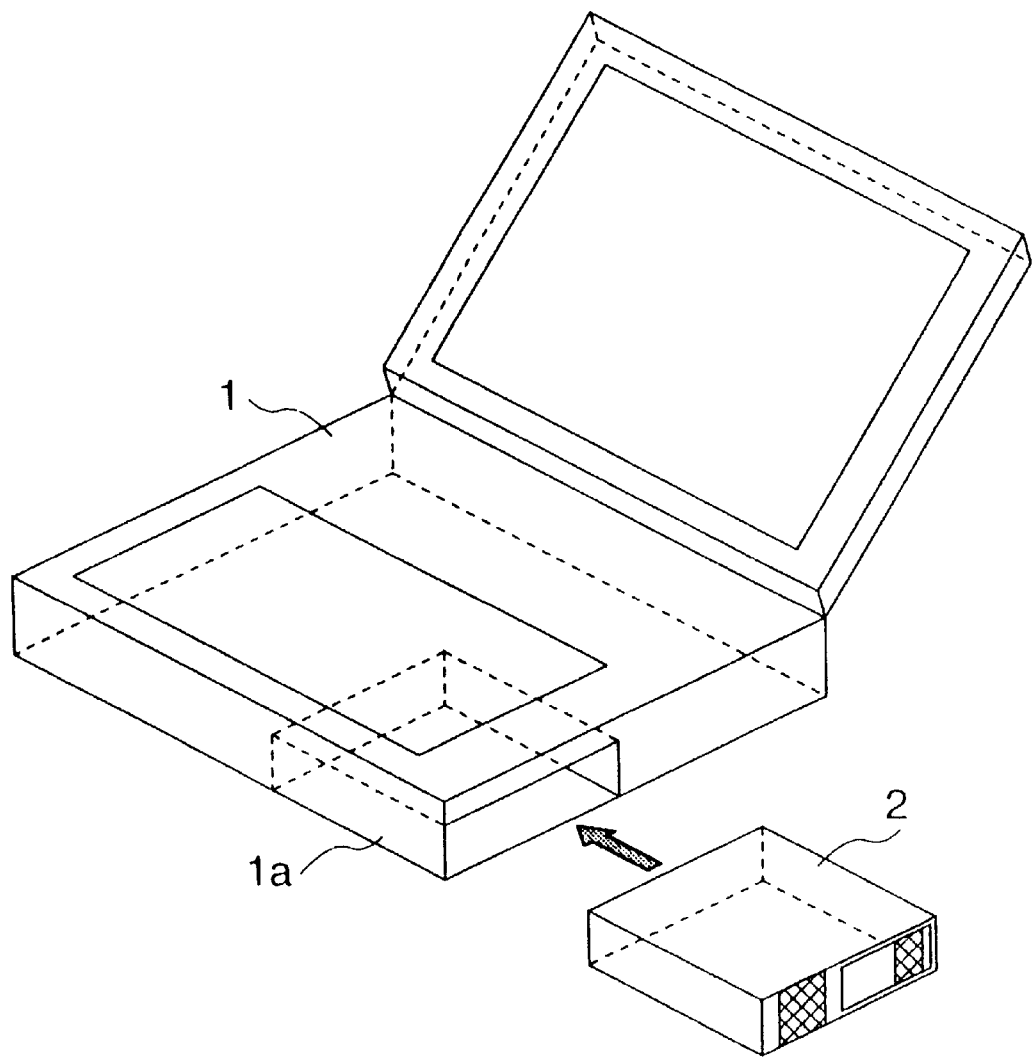
FIG. 1 is a perspective view showing a first embodiment of a fuel cell device of the present invention and an equipment on which the fuel cell device is mounted.
Figure 2:
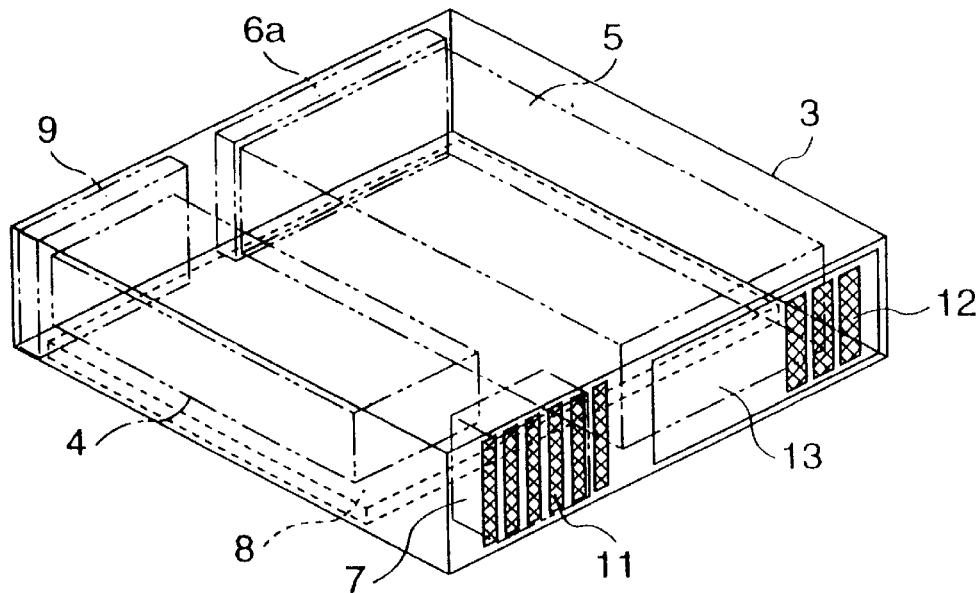
FIG. 2 is a perspective view of the fuel cell device of FIG. 1.
Figure 3:
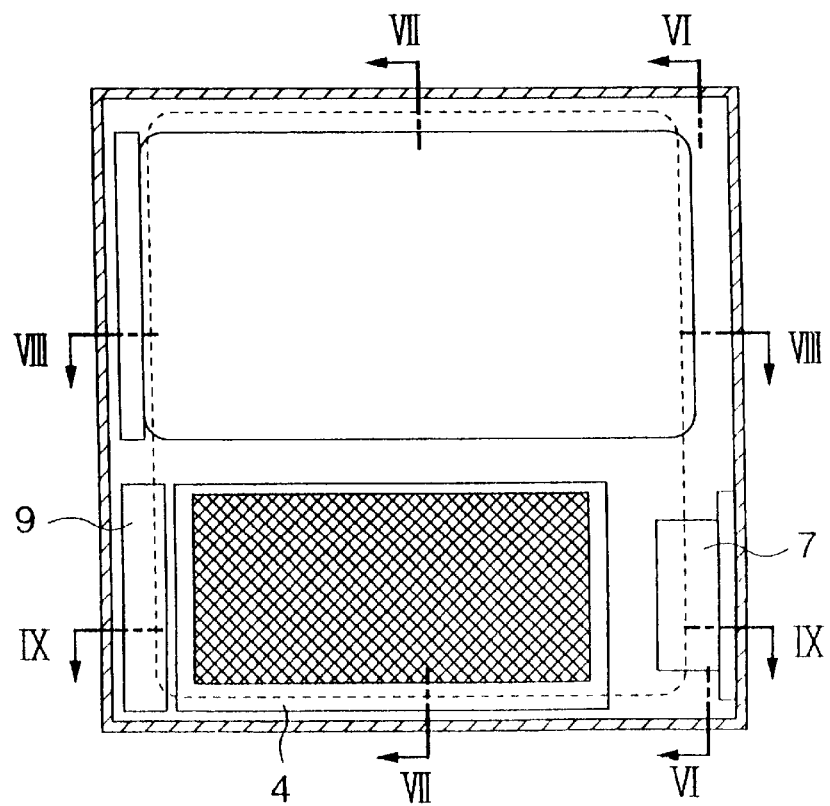
FIG. 3 is a top plan view of the fuel cell device of FIG. 1.
Figure 4:
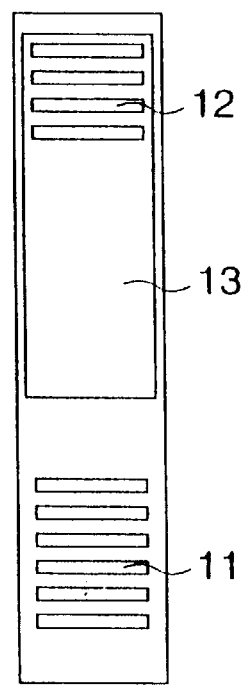
FIG. 4 is a right side-elevational view of the fuel cell device of FIG. 1.
Figure 5:
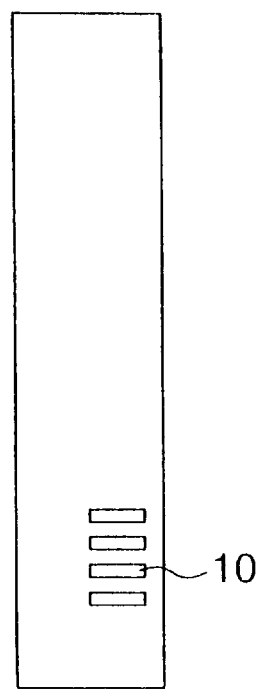
FIG. 5 is a left side-elevational view of the fuel cell device of FIG. 1.
Figure 6:
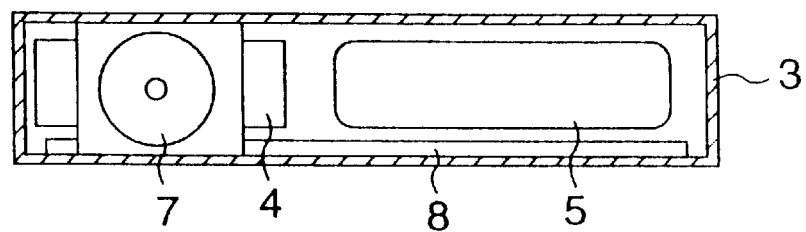
FIG. 6 is a cross-sectional view taken along the line VI—VI of FIG. 3.
Figure 7:
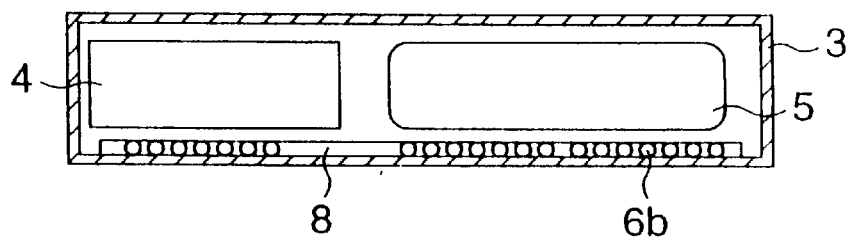
FIG. 7 is a cross-sectional view taken along the line VII—VII of FIG. 3.
Figure 8:
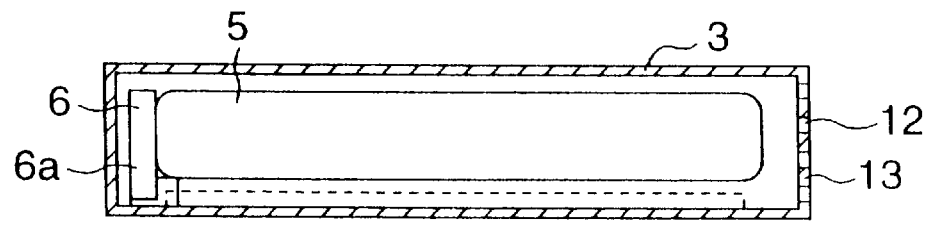
FIG. 8 is a cross-sectional view taken along the line VIII—VIII of FIG. 3.
Figure 9:
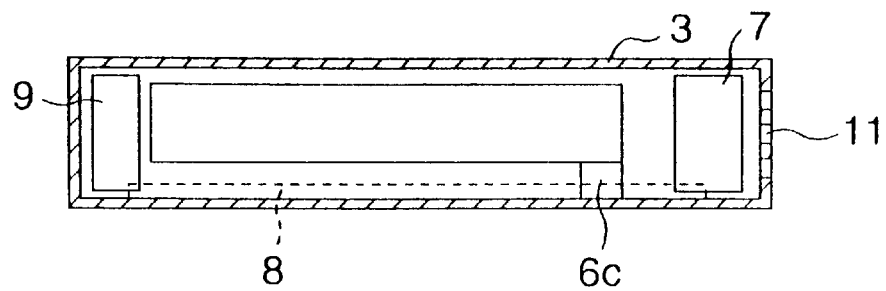
FIG. 9 is a cross-sectional view taken along the line IX—IX of FIG. 3.
Figure 10:
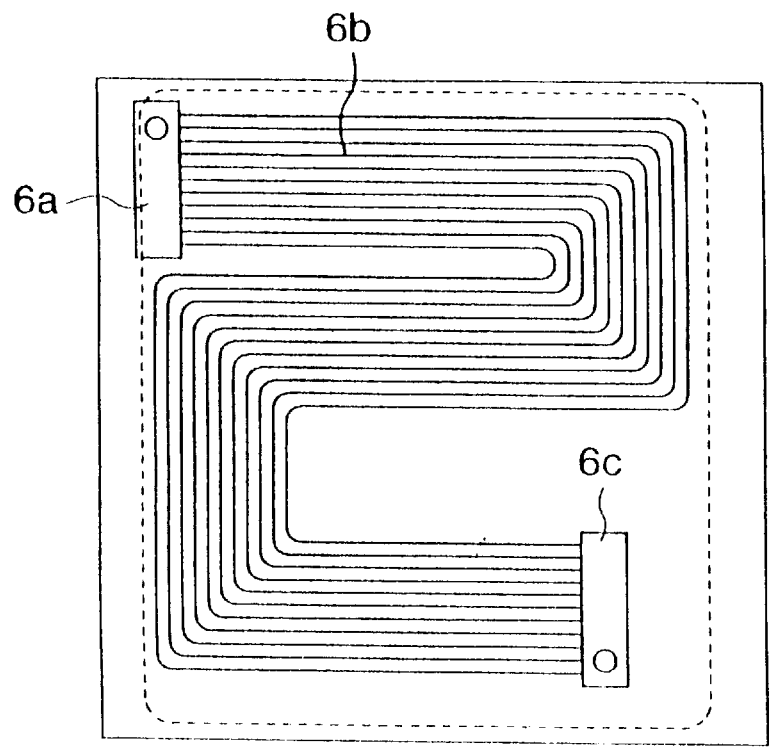
FIG. 10 is a view showing a humidifying means.
Figure 11:
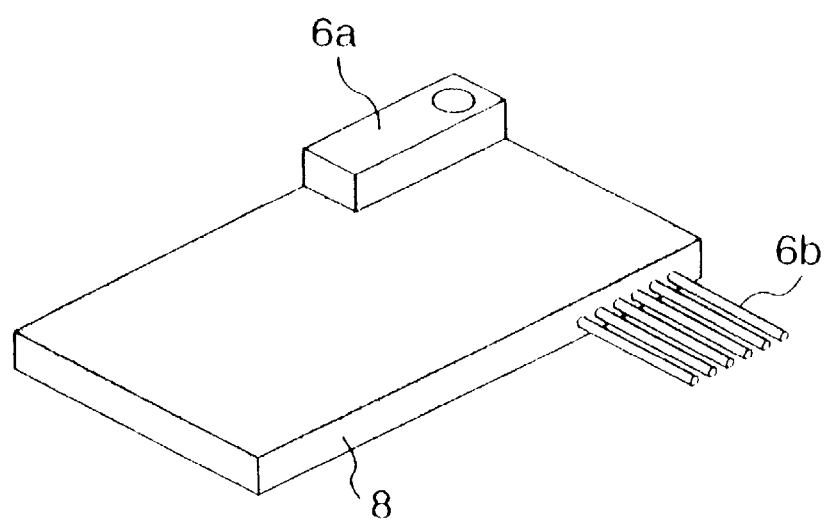
FIG. 11 is a view explanatory of a relation between hydrogen supply means and water retention means.
Figure 12:
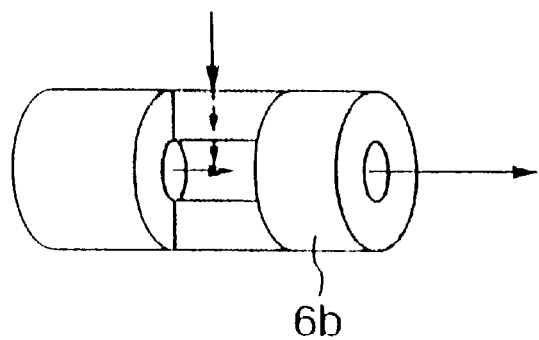
FIG. 12 is a view showing a construction of a hydrogen supply pipe.

A fuel cell device 2 is detachably received in a cell device-receiving portion 1a of an equipment 1, such as a personal computer and the like, for which a cell power source is required. The connection of the fuel cell device 2 to the equipment 1 is similar to that of a conventional nickel-metal hydride cell device or the like, and the fuel cell device 2 can be removably connected electrically and mechanically to the equipment 1. The cell device 2 includes a cell device casing 3 constituting a shell of the cell device 2. Mounted within the cell device casing 3 are a fuel cell body 4, a hydrogen storage unit 5 storing hydrogen to be used in the fuel cell body 4, hydrogen supply means 6a for feeding the hydrogen from the hydrogen storage unit 5 to the fuel cell body 4, air feed means 7 which comprises a fan or the like for supplying air to the fuel cell body 4 so as to supply oxygen necessary for the generation of electricity by the fuel cell, water retention means 8 for recovering and retaining water formed in the fuel cell body 4, and a control unit 9 for controlling an electricity-generating operation of the fuel cell body 4. These component parts are arranged within the cell device casing 3 in a manner shown in the drawings. An equipment connection terminal 10 for connecting the control portion 9 to the equipment 1, an intake port 11 and an exhaust port 12 of the air feed means 7, and a unit loading-unloading lid 13 which enables the hydrogen storage unit 5 to be inserted into and removed from the cell device casing 3 are provided in the cell device casing 3. As shown in FIGS. 7, 8 and 9, the hydrogen supply means 6 comprises a connecting portion 6a provided at one end thereof and detachably connected to the hydrogen storage unit 5 to receive the hydrogen in the hydrogen storage unit 5 without leakage, a plurality of hydrogen supply pipes 6b connected to the unit connecting portion 6a to feed the hydrogen from the hydrogen storage unit 5 to the fuel cell body 4, and a cell connecting portion 6c collectively connecting the plurality of hydrogen supply pipes 6b to a hydrogen supply port in the fuel cell body 4. The water retention means 8 is laid in a sheet-like manner on an inner bottom surface of the cell device casing 3 to be in intimate contact with a water-forming side of the fuel cell body 4. The water retention means 8 is extended to be disposed in contact with a lower surface of the hydrogen storage unit 5. The hydrogen supply pipes 6b are embedded in and retained by the water retention means 8. The water retention means 8 can be made of any one of various superabsorbent polymer used for sanitary goods such as a paper diaper and a sanitary napkin as described in the magazine "Surface" Vol. 33, NO. 4, pp. 52–53 (1995) and soil water-retention materials used in agriculture and horticulture. Particularly in this embodiment, a polyacrylate crosslink material and a starch-polyacrylate graft copolymer crosslink material were used. With the use of such a material, the formed water will not leak to the interior and exterior of the equipment 1. The hydrogen supply pipes 6b are made of a material which allows water to permeate therethrough, but gas not to permeate therethrough. One example of such a material is a solid polymer electrolyte such as a perfluorosulfonate-ionomer membrane. Since the hydrogen supply pipes 6b are embedded in the water retention means 8 as described above, the moisture or water in the water retention means 8 penetrates into the hydrogen supply pipes 6b through peripheral walls thereof, thereby humidifying the hydrogen gas flowing through the interior of these pipes 6b. The water retention means 8 is held in contact with the fuel cell body 4, and therefore absorbs heat produced when the fuel cell body 4 generates electricity, thus contributing to evaporation of the retained moisture. Besides, the water retention means 8 is extended to be held in contact with the hydrogen storage unit 5, and therefore transfers the heat, produced when the fuel cell body 4 generates electricity, to the hydrogen storage unit 5 to heat a hydrogen storing alloy, thereby enhancing an efficiency of a hydrogen-discharging reaction. Because of an endothermic action occurring when the hydrogen storing alloy discharges hydrogen, dew condensation may be formed on the surface of the hydrogen storage unit 5, in which case the dew condensation is absorbed and retained by the water retention means 8.

Figure 13:
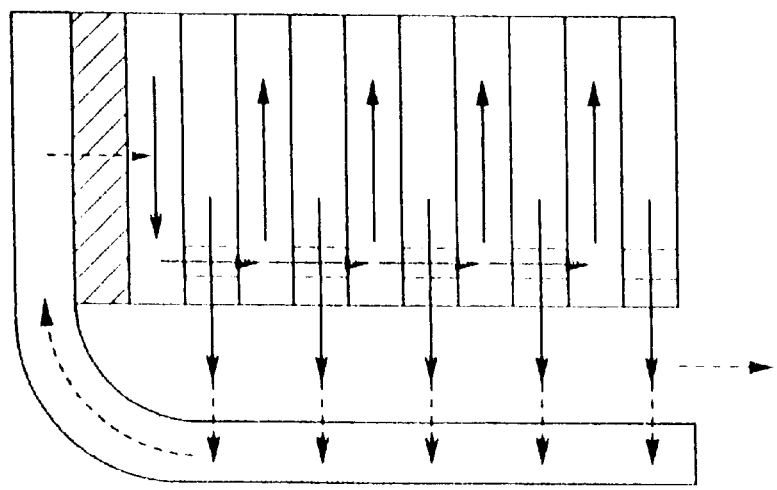
FIG. 13 is a view showing a modified water retention construction in a fuel cell body and comprising a water retention material.
Figure 14:
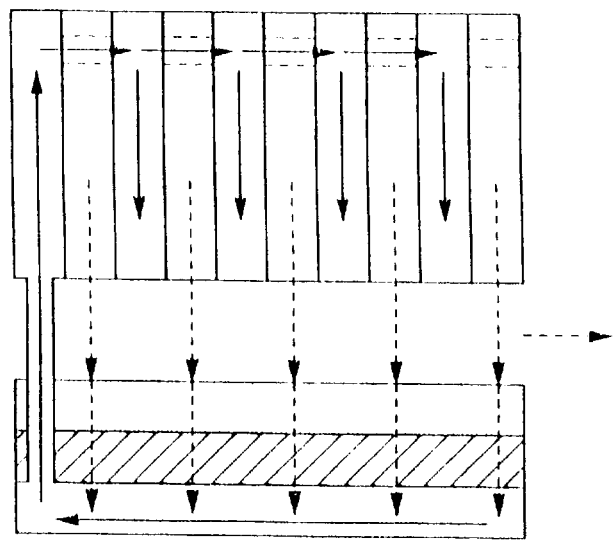
FIG. 14 is a view showing another modified water retention construction.

In this embodiment, in order to cause the water formed in the fuel cell body 4 to humidify the hydrogen gas generated from the hydrogen storage unit 5, there are used the water-permeable hydrogen supply pipes 6b which feed the hydrogen gas. However, there can be provided an arrangement, in which the flow of hydrogen gas contacts the formed water not through the pipes but through a sheet-like membrane as shown in FIGS. 13 and 14. This membrane may be incorporated in a portion of the stack of the fuel cell 4 (FIG. 13), or may be provided beneath the fuel cell body 4 (FIG. 14).

An amount of water formed in the fuel cell body 4 during the generation of electricity can be detected, for example, by detecting an amount of expansion of the material of the water retention means 8, or by detecting a change in dielectric constant or resistivity of the water retention means 8. As for the water retention means, there is used the water retention material which swells upon absorption of water as in this embodiment, and there may be used a water retention tank for recovering the water, in which case an amount of the recovered water can be detected by detection means such as a float switch. When an amount of the water recovered by the water retention means fails to decrease sufficiently due to evaporation and so on, so that the recovered water amount detection means indicates that the recovered water must be discharged, the water can be discharged to the exterior, for example, by exchanging the water retention material or by removing the tank.

Examples of methods of having evaporation reducing an amount of water recovered by the water retention means include a method of utilizing heat produced by the fuel cell body 4 as described above, and a method of detecting a thermal expansion coefficient of the water retention means to drive an air supply fan to promote the evaporation of the water by an air flow. In the latter method, the fan is supplied with electric power from the fuel cell body, or may be supplied with an external power source if the associated equipment is connected to the external power source. When all of the hydrogen in the hydrogen storage unit 5 is consumed, the hydrogen storage unit 5 is replaced with a new one such that the unit loading-unloading lid 13 is opened to allow the unit 5 to be removed and the new unit 5 to be entered.

Examples of methods of detecting an operating time of the fuel cell includes a method of using a pressure sensor for detecting an amount of the hydrogen remaining in the hydrogen storage unit 5, a method of detecting an accumulated flow rate of the hydrogen, a method of integrating an amount of the generated electricity to find an amount of reaction of the hydrogen to thereby calculate an amount of the remaining hydrogen, and a method of detecting an amount of the formed water by the above-mentioned method to calculate an amount of consumption of the hydrogen. In the case where the equipment, on which the fuel cell power source is mounted, is a note-type personal computer as in this embodiment, estimated values of an operation time elapsed and an remaining operating time are outputted through the equipment connection terminal 10 to be displayed on the equipment 1. Of course, the equipment can be so constructed as to manage various data including a voltage and electric current of the fuel cell power source, pressure, temperature and resistivity of the hydrogen, an operating condition of the fan, and an amount of the formed water.

Figure 15:
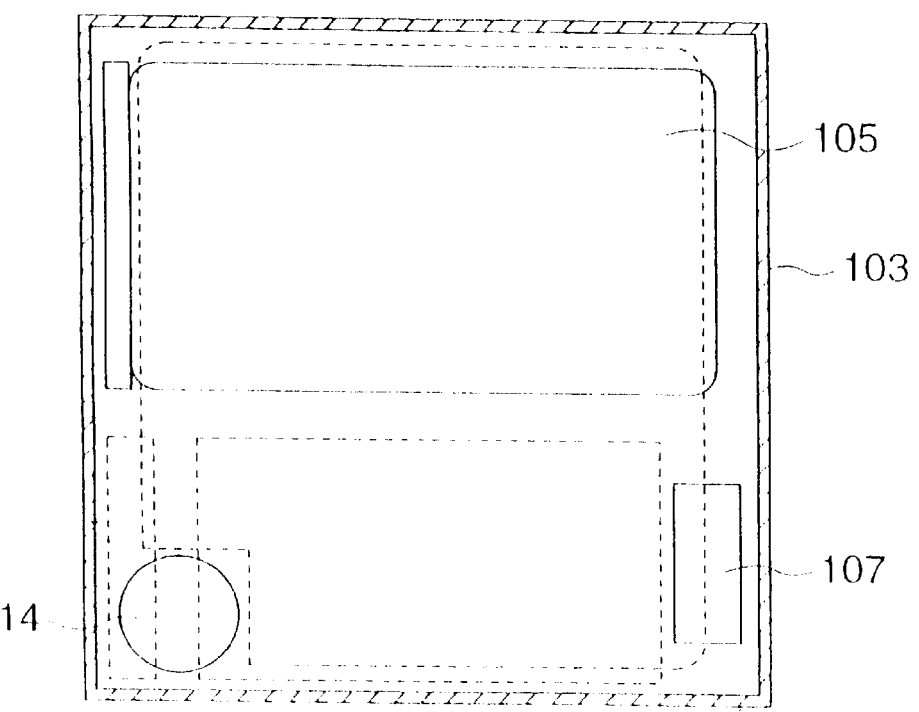
FIG. 15 is a top plan view of a second embodiment of a fuel cell device of the invention, with an upper side thereof removed.

FIG. 15 shows a second embodiment of the present invention. In this construction, an auxiliary cell 14 is housed in a cell device casing 103. The auxiliary cell 14 assists in driving a fan 107 at a start-up, and therefore a large amount of air can be supplied from the beginning of the start-up to improve an output rise characteristics. Also, the auxiliary cell 14 can be used for controlling a pressure in a hydrogen storage unit 105 at the suspension of the fuel cell, forming a backup for the storage of the above various data, and dealing with an emergency such as a gas leakage. In this embodiment, the auxiliary cell 14 can employ a primary cell, in which a cell loading-unloading lid is provided for exchange, or the auxiliary cell 14 can employ a secondary cell to be charged by the fuel cell. The auxiliary cell can have similar functions, using a cell mounted on an associated equipment.

Figure 16:
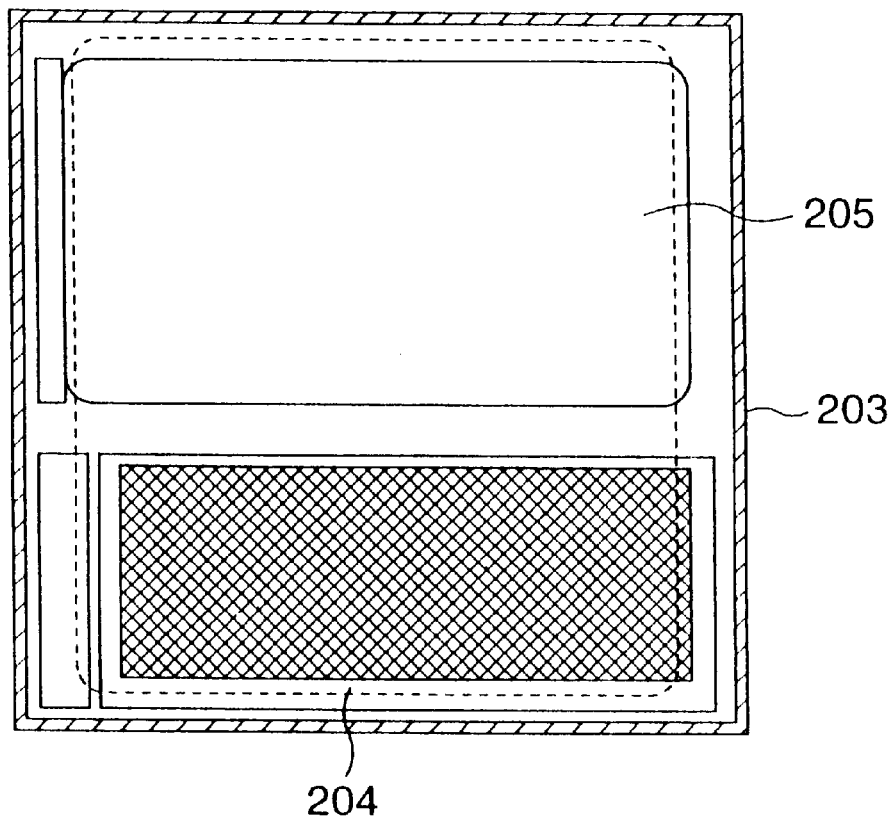
FIG. 16 is a top plan view of a third embodiment of a fuel cell device of the invention, with an upper side thereof removed.
Figure 17:
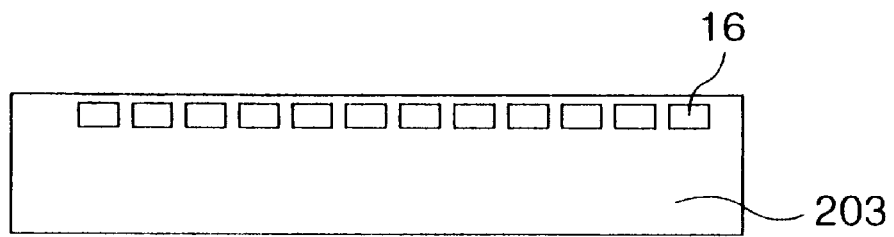
FIG. 17 is a side-elevational view of the fuel cell device of FIG. 16.

FIG. 16 shows a third embodiment of the invention, in which a fan is not provided in a cell device casing 203. In the case where a fuel cell device is mounted on an equipment such as a note-type personal computer, such an equipment is, in many cases, provided with a fan for cooling a body of the equipment. In this embodiment, a fuel cell generates electricity, taking in an air flow produced by the fan in the equipment. The cell device casing 203 has intake ports 16 for taking in the cooling air from the equipment. In this case, since any fan is not provided in the fuel cell device, there is an advantage in that a fuel cell body 204 can be increased in size so as to increase an output, and a hydrogen storage unit can be increased in size so as to extend an operating time. If air having cooled the equipment is used, air beforehand heated can be used to advantageously promote an electrochemical reaction of the fuel cell body 204 with efficiency.

In this embodiment, the hydrogen storage unit 205 is heated by the air discharged from the fuel cell body 204 while there can be used a construction, in which heat generated from the equipment, on which the fuel cell power source is mounted, is transferred to the unit by the use of a high thermally-conductive metal such as copper or aluminum or carbon materials in order to achieve similar effects. The hydrogen storing alloy may comprise an alloy adapted to produce hydrogen at low temperature so that the construction for heating the bomb can be omitted. While examples of methods of humidifying the hydrogen gas so as to humidify the ion exchange membranes of the fuel cell have been described, the ion exchange membrane may comprise a membrane having a film thickness of, for example, not more than 50 mm and capable of easily causing back-diffusion of water, and in this case the membrane can be sufficiently humidified by means of the formed water, providing an advantage in that the various constructions required for humidifying the membranes can be omitted to thereby be made simple, the fuel cell body can be further increased in size to increase an output, and the hydrogen storage unit can be increased in size so as to extend an operating time.

Figure 18:
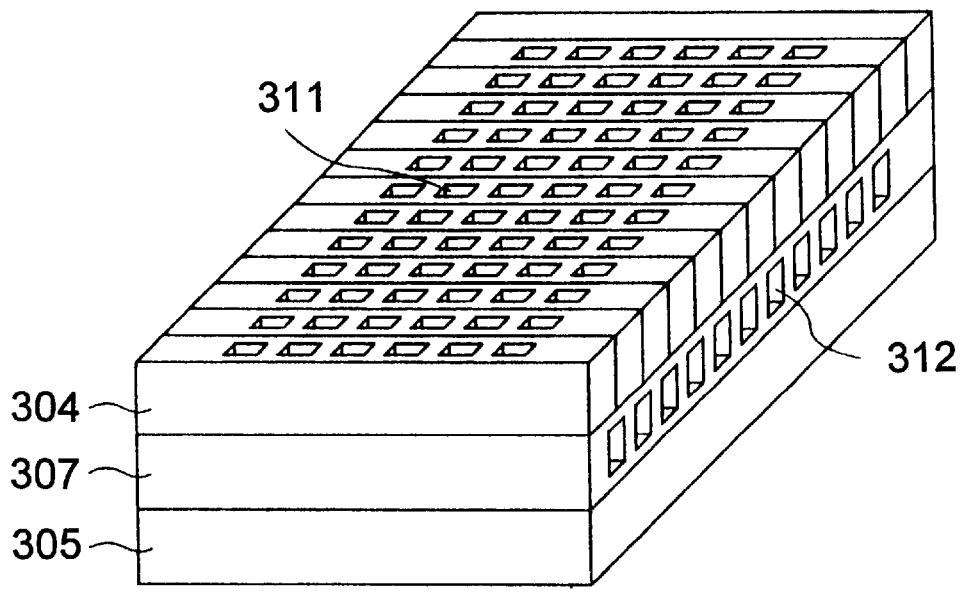
FIG. 18 is a perspective view of a fourth embodiment of a fuel cell device of the invention.
Figure 19:
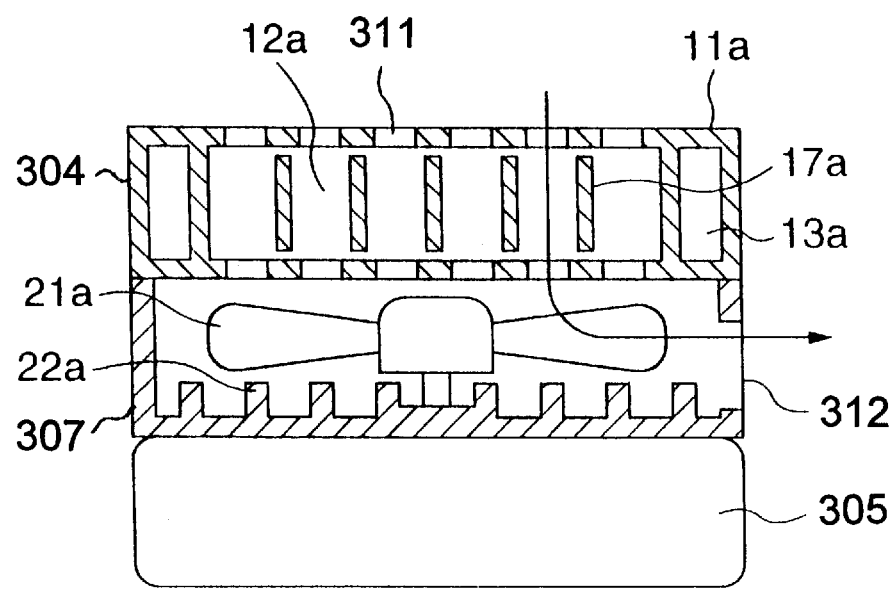
FIG. 19 is a cross-sectional view of the fuel cell device of FIG. 18.
Figure 20:
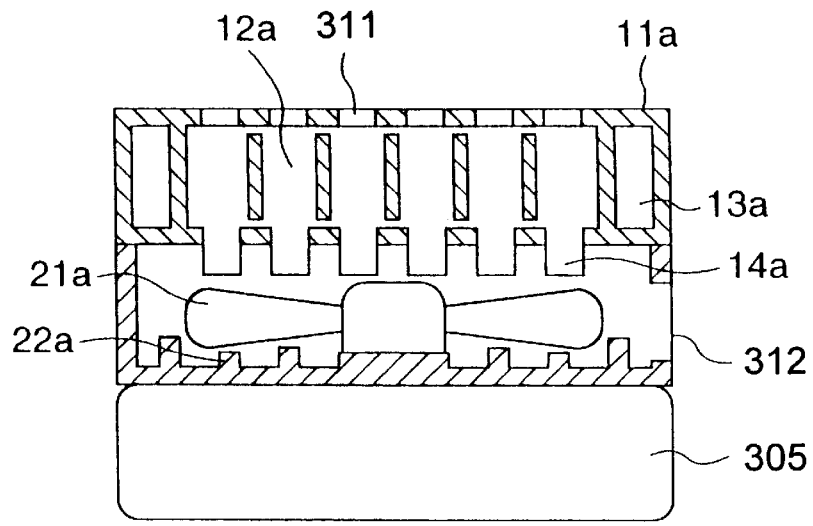
FIG. 20 is a cross-sectional view of a modified radiating construction of a fuel cell body.
Figure 21:
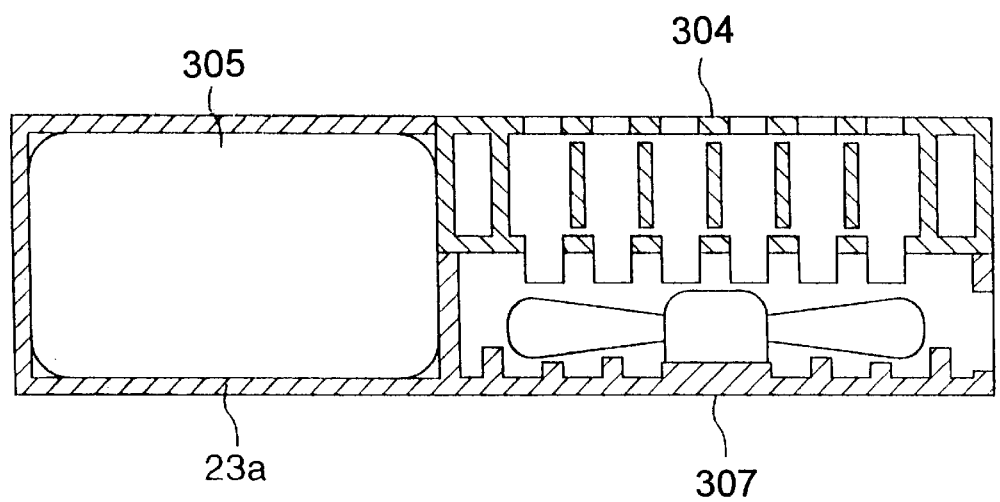
FIG. 21 is a cross-sectional view of a modified form of the invention, in which a hydrogen storing alloy is differently positioned.

FIG. 18 is a perspective view of a fourth embodiment of a fuel cell device of the present invention, FIG. 19 is a cross-sectional view of the fuel cell device, and FIGS. 20 and 21 are cross-sectional views showing modifications of this embodiment. A fuel cell body 304, a hydrogen storage unit 305 storing hydrogen to be used in the fuel cell body 4, and air feed means 7 comprising a fan or the like and interconnecting the hydrogen storage unit 305 and the fuel cell body 304 to supply to the fuel cell body 304 air required for supplying of oxygen for the generation of electricity from the fuel cell are arranged as shown in the drawings. Provided in the fuel cell device are an intake port 311 and an exhaust port 312. In the fuel cell body 304, each of unit cells is held between separator plates 12*a*, and each of the separator plates 12*a* is electrically connected to the corresponding unit cell through electrically-conductive portions 17*a* of titanium or the like and held in contact with the unit cell. A positive electrode and a negative electrode of the unit cell are electrically insulated from each other by a polymer electrolyte membrane and a gasket or the like. Here, if a frame portion 11*a* integral with the separator is made of an insulating material such as a liquid crystal polymer, a more positive insulating effect is obtained, and an insulating failure due to misregistration in assembly of the fuel cell and pinholes in the gasket can be prevented. Waste heat of the fuel cell is discharged to outside of the fuel cell body by an air flow produced by the air feed means 307. Here, if portions of the separator plates 12a are exposed to outside of the fuel cell to form radiating fins 14a as shown in FIG. 20 so as to enhance a radiating efficiency, the waste heat temperature can be raised. The air feed means 307 has a heat sink structure 22a made of metal such as aluminum or copper, a carbon material or a resin material of good thermal conductivity to enable recovering the waste heat of the fuel cell efficiently. The air feed means 307 is held in contact with the hydrogen storage unit 305 to enable transferring the recovered heat to a hydrogen storing alloy. If the air feed means 307 is connected to the hydrogen storage unit 305 through a heat transfer plate 23a made of copper such as aluminum or copper, a carbon material or a resin material of good thermal conductivity as shown in FIG. 21, the construction can be variously made to be conformed to a space available in an equipment, on which the fuel cell electricity-generating system is mounted. Further, if the heat transfer plate 23a is connected to the hydrogen storage unit 305 through a silver paste, a carbon paste or an electrically-conductive and thermally-conductive material in the form of an adhesive sheet or tape, the more efficient heat transfer can be achieved.

Figure 22:
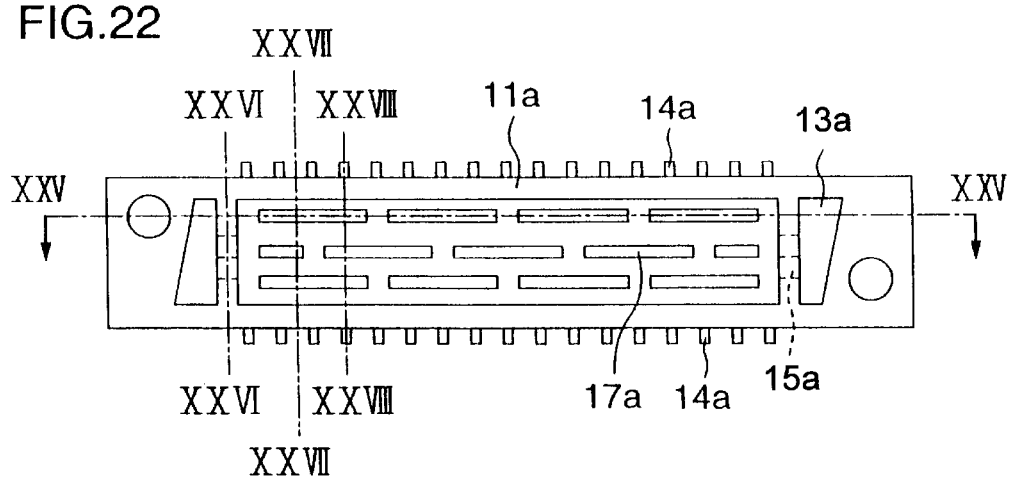
FIG. 22 is a top plan view of a separator plate of the fuel cell device of FIG. 21 as seen from a hydrogen electrode side thereof.
Figure 23:
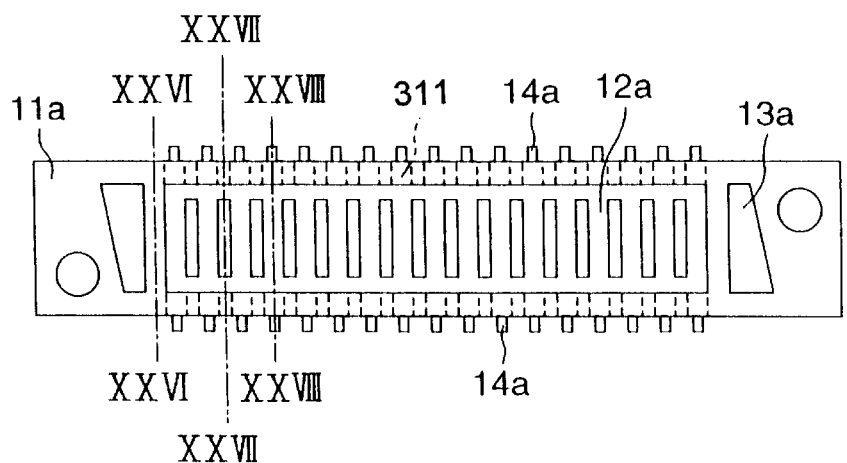
FIG. 23 is a top plan view of the separator plate of FIG. 21 as seen from an air electrode side thereof.
Figure 24:
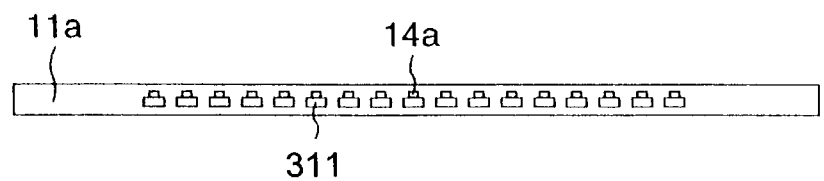
FIG. 24 is a side-elevational view of the separator plate of FIG. 21.
Figure 25:
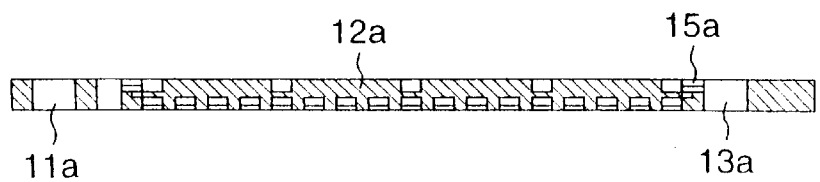
FIG. 25 is a cross-sectional view taken along the line XXV—XXV of FIG. 22.
Figure 26:
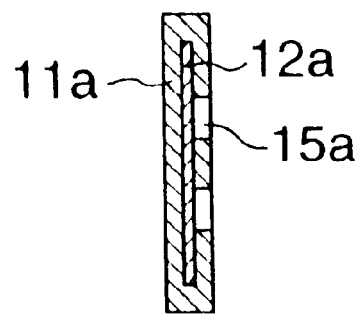
FIG. 26 is a cross-sectional view taken along the line XXVI—XXVI of FIG. 22.
Figure 27:
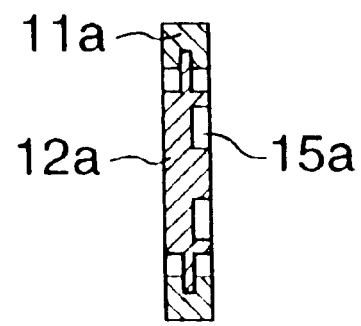
FIG. 27 is a cross-sectional view taken along the line XXVII—XXVII of FIG. 22.
Figure 28:
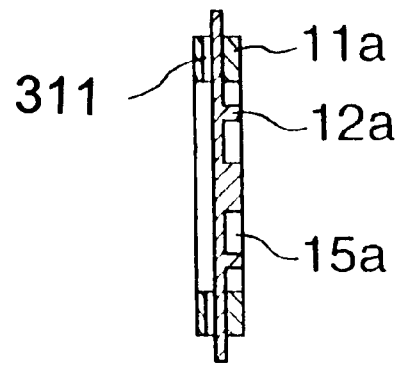
FIG. 28 is a cross-sectional view taken along the line XXVIII—XXVIII of FIG. 22.

FIGS. 22 to 28 show the construction of the separator plate 12a of the fuel cell device in further detail. FIG. 22 is a top plan view of the separator as seen from a hydrogen electrode side, FIG. 23 is a top plan view thereof as seen from an oxygen electrode side, and FIG. 24 is a side-elevational view thereof. FIG. 25 is a cross-sectional view taken along the line XXV—XXV of FIG. 22, FIG. 26 is a cross-sectional view taken along the line XXVI—XXVI of FIG. 22, FIG. 27 is a cross-sectional view taken along the line XXVII—XXVII of FIG. 22, and FIG. 28 is a cross-sectional view taken along the line XXVIII—XXVIII of FIG. 22. Hydrogen is supplied through a manifold 13a, which serves as a pressure equalizer chamber for distributing the hydrogen uniformly to the unit cells, and a flow passage 15a. Radiating fins 14a are provided both at air supply ports 311 and air exhaust ports 312 to enhance the radiating effect.

The electrically-conductive portions of the separator plate may be made of acid-resistant stainless steel such as SUS316 and SUS316L as well as titanium.

The insulator for the frame portion integral with the separator can be made of other material than crystal liquid polymer. Examples thereof include chemical-resistant, thermal-resistant engineering plastics of creep properties such as modified polyphenylene ether (modified PPE), polyether ether ketone (PEEK), polyphenylene sulfide (PPS), polyether sulfone (PES) and polysulphone (PSF).

In the above embodiments, the equipment, on which the fuel cell power source of the present invention is mounted, is shown as being a note-type personal computer while the fuel cell power source can be applied to other various equipments such as portable printers, facsimile machines, telephones, television sets, telecommunication equipments, an audio-video equipments, electric fans, heat-reserving/cold-reserving equipments, electric irons, electric pots, electric cleaners, electric rice cookers, electromagnetic cooking machines, lightening apparatus, toys such as a game machine and a radio control car, and power tools. The fuel cell power source of the invention is best suited particularly for those equipments which are required to operate for at least 3 hours with an output of at least 10 watt.

As described above, according to the present invention, the overall system required for generating electricity can be incorporated into one package, and also waste heat of the fuel cell can be efficiently transferred to the hydrogen storing alloy, and the power system comprising the microminiature fuel cell can be realized. When such power system is mounted on a portable equipment, the equipment can be operated for a longer time as compared with the case where a conventional primary or secondary cell is used, and also after the generation of electricity is finished, the hydrogen storage unit is charged with hydrogen, or is replaced by a new one which is filled with hydrogen, and by doing so, the generation of electricity can be resumed soon. Further, the power system of the invention can be used repeatedly, and therefore is advantageous from a resource-saving point of view.

What is claimed is:

1. A fuel cell assembly for portable equipment, comprising:
    a fuel cell body;
    a hydride hydrogen storage unit;
    a control unit for controlling the flow of hydrogen from said hydrogen storage unit;
    hydrogen supply means interconnecting said hydrogen storage unit and said fuel cell body to supply the hydrogen from said hydrogen storage unit to said fuel cell body; and
    air feed means for supplying air to said fuel cell body to supply oxygen necessary for generation of electricity performed by said fuel cell, wherein heat generated in said fuel cell body is conducted by an air flow produced by said air feed means to said hydrogen storage unit to heat said hydrogen storage unit, and wherein said air feed means includes a heat-transfer member which contacts said hydrogen storage unit to transmit said generated heat thereto.

2. A fuel cell assembly according to claim 1, in which said heat transfer member is bonded to said hydrogen storage unit by a heat-transfer material.

3. A fuel cell assembly according to claim 1, in which said fuel cell body is constructed to radiate heat generated therein away from said fuel cell body, and is cooled by an air flow produced by said air feed means.

4. A fuel cell assembly according to claim 3, in which said fuel cell body collects electricity from a positive electrode and a negative electrode, and comprises a first flow passage for hydrogen and a second flow passage for air, and separator members to separate said first flow passage and said second flow passage from one another, whereby hydrogen and air are maintained separate from each other.

5. A fuel cell assembly according to claim 4, comprising a frame portion of an electrically-insulating material which encloses peripheral edge portions of said separator members, and wherein a part of said separator members is exposed outside said frame portion so as to radiate generated heat away from said fuel cell body.

6. A fuel cell assembly according to claim 1, in which a dirt-collecting filter is provided at an air intake side of said air feed means.

7. A fuel cell assembly according to claim 1, in which an auxiliary cell or a capacitor is housed in said cell device casing.

8. A fuel cell assembly according to claim 1, further comprising means for indicating an amount of hydrogen remaining in said hydrogen storage unit.

9. A fuel cell assembly according to claim 1, wherein said fuel cell body comprises a polymer electrolyte fuel cell.

10. A fuel cell assembly for portable equipment, comprising:

a fuel cell body;

a hydride hydrogen storage unit;

a control unit for controlling the flow of hydrogen from said hydrogen storage unit;

hydrogen supply means interconnecting said hydrogen storage unit and said fuel cell body to supply the hydrogen from said hydrogen storage unit to said fuel cell body;

air feed means for supplying air to said fuel cell body to supply oxygen necessary for generation of electricity performed by said fuel cell, wherein heat generated in said fuel cell body is conducted by an air flow produced by said air feed means to said hydrogen storage unit to heat said hydrogen storage unit, and wherein said air feed means includes a heat-transfer member which contacts said hydrogen storage unit to transmit said generated heat thereto;

water retention means for recovering and retaining water formed in said fuel cell body;

humidifying means for humidifying the hydrogen to be supplied to said fuel cell body, using said recovered water; and a cell assembly casing to house said fuel cell body, said hydrogen storage unit, said control unit, said hydrogen supply means, said air feed means, said water retention means and said humidifying means therein, said cell assembly casing being electrically and mechanically removably connected to said portable equipment fuel cell assembly;

wherein said cell assembly casing has an intake port and an exhaust port of said air feed means, and means for inserting and removing said hydrogen storage unit from said cell assembly casing; and wherein said hydrogen supply means is detachably connected to said hydrogen storage unit.

11. A fuel cell assembly according to claim 10, in which said humidifying means is constructed such that at least a part of said hydrogen supply means is constituted by a hydrogen-impermeable, water-permeable membrane and water retained in said water retention means is brought through said membrane into contact with the hydrogen passing through said hydrogen supply means.

12. A fuel cell assembly according to claim 11, in which a part of said hydrogen supply means comprises a hydrogen-impermeable, water-permeable pipe enclosed in said water retention means, and the hydrogen flowing through said pipe is humidified by the water retained in said water retention means.

13. A fuel cell assembly according to claim 11, in which said water retention means is held in contact with said fuel cell body so that the water retained in said water retention means is evaporate by heat generated by said fuel cell body.

14. A fuel cell assembly according to claim 10, in which said water retention means is made of a material which absorbs water and swells to retain the water, and the water in said water retention means is evaporated through a surface of said material, thereby reducing an amount of the water retained in said water retention means.

15. A fuel cell assembly for portable equipment having air feed means for cooling the interior of said equipment, comprising:

a fuel cell body;

a hydride hydrogen storage unit necessary for said fuel cell body;

a control unit for controlling a flow of the hydrogen from said hydrogen storage unit;

hydrogen supply means interconnecting said hydrogen storage unit and said fuel cell body to supply the hydrogen from said hydrogen storage unit to said fuel cell body;

water retention means for recovering and retaining water formed in said fuel cell body;

humidifying means for humidifying the hydrogen to be supplied to said fuel cell body, using said recovered water; and a cell assembly casing to house said fuel cell body, said hydrogen storage unit, said control unit, said hydrogen supply means, said water retention means and said humidifying means therein, said cell assembly casing being electrically and mechanically removably connected to said portable equipment;

wherein said cell assembly casing has an intake port and an exhaust port of said air feed means, and means for inserting and removing said hydrogen storage unit from said cell assembly casing; and wherein an air flow produced by said air feed means is conducted to said fuel cell body, and oxygen necessary for generation of electricity performed by said fuel cell is provided by said air flow.

* * * * *